US011919334B2

(12) United States Patent
Wakabayashi et al.

(10) Patent No.: US 11,919,334 B2
(45) Date of Patent: Mar. 5, 2024

(54) TWO-WHEELED VEHICLE TIRE

(71) Applicant: BRIDGESTONE CORPORATION, Tokyo (JP)

(72) Inventors: Tomoyuki Wakabayashi, Tokyo (JP); Yasufumi Tokitoh, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 348 days.

(21) Appl. No.: 17/041,029

(22) PCT Filed: Feb. 19, 2019

(86) PCT No.: PCT/JP2019/006130
§ 371 (c)(1),
(2) Date: Sep. 24, 2020

(87) PCT Pub. No.: WO2019/220727
PCT Pub. Date: Nov. 21, 2019

(65) Prior Publication Data
US 2021/0138840 A1    May 13, 2021

(30) Foreign Application Priority Data

May 15, 2018    (JP) .................................. 2018-094140

(51) Int. Cl.
| B60C 11/11 | (2006.01) |
| B60C 11/03 | (2006.01) |
| B60C 11/13 | (2006.01) |

(52) U.S. Cl.
CPC ........... B60C 11/0311 (2013.01); B60C 11/11 (2013.01); *B60C 2011/1361* (2013.01); *B60C 2200/10* (2013.01); *B60C 2200/14* (2013.01)

(58) Field of Classification Search
CPC . B60C 2200/10; B60C 11/11; B60C 2200/14; B60C 11/0311; B60C 2011/1361
See application file for complete search history.

(56) References Cited

U.S. PATENT DOCUMENTS

| 5,088,535 A | 2/1992 | Potts et al. | |
| 5,377,734 A * | 1/1995 | Klein | ...................... B60C 11/11 |
| | | | 152/209.15 |

(Continued)

FOREIGN PATENT DOCUMENTS

| CN | 202935097 U | 5/2013 |
| CN | 206537066 U | 10/2017 |

(Continued)

OTHER PUBLICATIONS

Feb. 8, 2022 Search Report issued in Chinese Application No. 201980032006.8.

(Continued)

*Primary Examiner* — Cedrick S Williams
*Assistant Examiner* — Thomas Frank Schneider
(74) *Attorney, Agent, or Firm* — Oliff PLC

(57) ABSTRACT

A two-wheeled vehicle tire achieves a further improvement particularly in the traction performance during turning on soft ground. A two-wheeled vehicle tire includes a tread portion formed in an annular shape. The tread portion includes: center land portions arranged on a tire equator CL; middle land portions arranged on the tire width-direction outer side of the center land portions; and shoulder land portions arranged on the tire width-direction outer side of the middle land portions, and T-shaped or Y-shaped land portions each constituted by three partial land portions connected at one end are arranged between the center land portions and the shoulder land portions.

6 Claims, 3 Drawing Sheets

(56) References Cited

U.S. PATENT DOCUMENTS

| | | | |
|---|---|---|---|
| 8,109,307 B2* | 2/2012 | Oyama | B60C 11/13 152/902 |
| 2011/0308681 A1 | 12/2011 | Nakamura | |
| 2012/0048436 A1* | 3/2012 | Matsumura | B60C 11/0302 152/209.1 |
| 2016/0075186 A1 | 3/2016 | Tamura | |
| 2018/0154699 A1* | 6/2018 | Miwa | B60C 11/0302 |
| 2018/0264888 A1 | 9/2018 | Hinami | |

FOREIGN PATENT DOCUMENTS

| | | | | |
|---|---|---|---|---|
| JP | S61-39605 U | | 3/1986 | |
| JP | H0234408 A | * | 2/1990 | |
| JP | H03-239605 A | | 10/1991 | |
| JP | 2000-025417 A | | 1/2000 | |
| JP | 2000025417 A | * | 1/2000 | B60C 11/11 |
| JP | 2010-143370 A | | 7/2010 | |
| JP | 2015-147546 A | | 8/2015 | |
| JP | 2015147546 A | * | 8/2015 | |
| JP | 2016-060347 A | | 4/2016 | |
| JP | 2016-145008 A | | 8/2016 | |
| JP | 2018-154241 A | | 10/2018 | |

OTHER PUBLICATIONS

Apr. 23, 2019 International Search Report issued in International Patent Application No. PCT/JP2019/006130.
Apr. 23, 2019 Written Opinion issued in International Patent Application No. PCT/JP2019/006130.
Jul. 5, 2022 Search Report issued in Chinese Patent Application No. 201980032006.8.

* cited by examiner

TWO-WHEELED VEHICLE TIRE

TECHNICAL FIELD

The present invention relates to a two-wheeled vehicle tire (hereinafter, also simply referred to as "tire"). More specifically, the present invention relates to a two-wheeled vehicle tire, particularly a motorcycle tire, which pertains to an improvement of block-shaped land portions formed in a tread portion.

BACKGROUND ART

Generally, two-wheeled vehicle tires for off-road travel, which are intended to be used on rough terrain such as sandy terrain and muddy terrain, include a tread portion that employs a block pattern composed of plural blocks. In order to attain desired performance in such tires, a variety of tread patterns have been proposed.

For example, Patent Document 1 discloses a motorcycle pneumatic tire for off-road travel that includes a tread portion having a designated rotational direction, wherein plural blocks are formed in the tread portion; the blocks include plural crown blocks arranged on the tire equator, and plural middle blocks arranged on the both sides of the crown blocks in the tire axial direction; the crown blocks each include a laterally elongated block main body having a greater length in the tire axial direction than in the tire circumferential direction, and a protruding part that protrudes from a tire-axial-direction central part of the block main body to the trailing side in the rotational direction; and, in a block group composed of a single crown block and a pair of middle blocks arranged closest to the crown block on both sides of the crown block, the center of gravity of the crown block is positioned on the trailing side in the rotational direction relative to the middle blocks, and the centers of gravity of the middle blocks are positioned on the leading side in the rotational direction relative to the crown block.

RELATED ART DOCUMENT

Patent Document

[Patent Document 1] JP2016-060347A (Claims, etc.)

SUMMARY OF THE INVENTION

Problems to be Solved by the Invention

However, in two-wheeled vehicle tires used in motocross applications and the like, a further improvement has been desired in terms of the traction performance during turning, particularly the traction performance during turning on soft ground.

In view of the above, an object of the present invention is to provide a two-wheeled vehicle tire that achieves a further improvement particularly in the traction performance during turning on soft ground.

Means for Solving the Problems

The present inventors intensively studied to discover that the above-described problem can be solved by adopting the following constitution, thereby completing the present invention.

That is, the present invention is a two-wheeled vehicle tire including a tread portion formed in an annular shape, the two-wheeled vehicle tire being characterized in that:

the tread portion include center land portions arranged on a tire equator, middle land portions arranged on the tire width-direction outer side of the center land portions, and shoulder land portions arranged on the tire width-direction outer side of the middle land portions; and T-shaped or Y-shaped land portions, which are each constituted by three partial land portions connected at one end, are arranged between the center land portions and the shoulder land portions.

In the present invention, it is preferred that at least two of the three partial land portions extend at an angle with respect to both the tire circumferential direction and the tire width direction.

Further, in the present invention, it is preferred that the two-wheeled vehicle tire includes a section in which the middle land portions and the T-shaped or Y-shaped land portions are alternately arranged in the tire circumferential direction.

Still further, in the present invention, it is preferred that the T-shaped or Y-shaped land portions be arranged at a lower height than land portions arranged adjacent to the T-shaped or Y-shaped land portions.

Effects of the Invention

According to the present invention, a two-wheeled vehicle tire that achieves a further improvement particularly in the traction performance during turning on soft ground can be realized.

MODE FOR CARRYING OUT THE INVENTION

Figure 1:
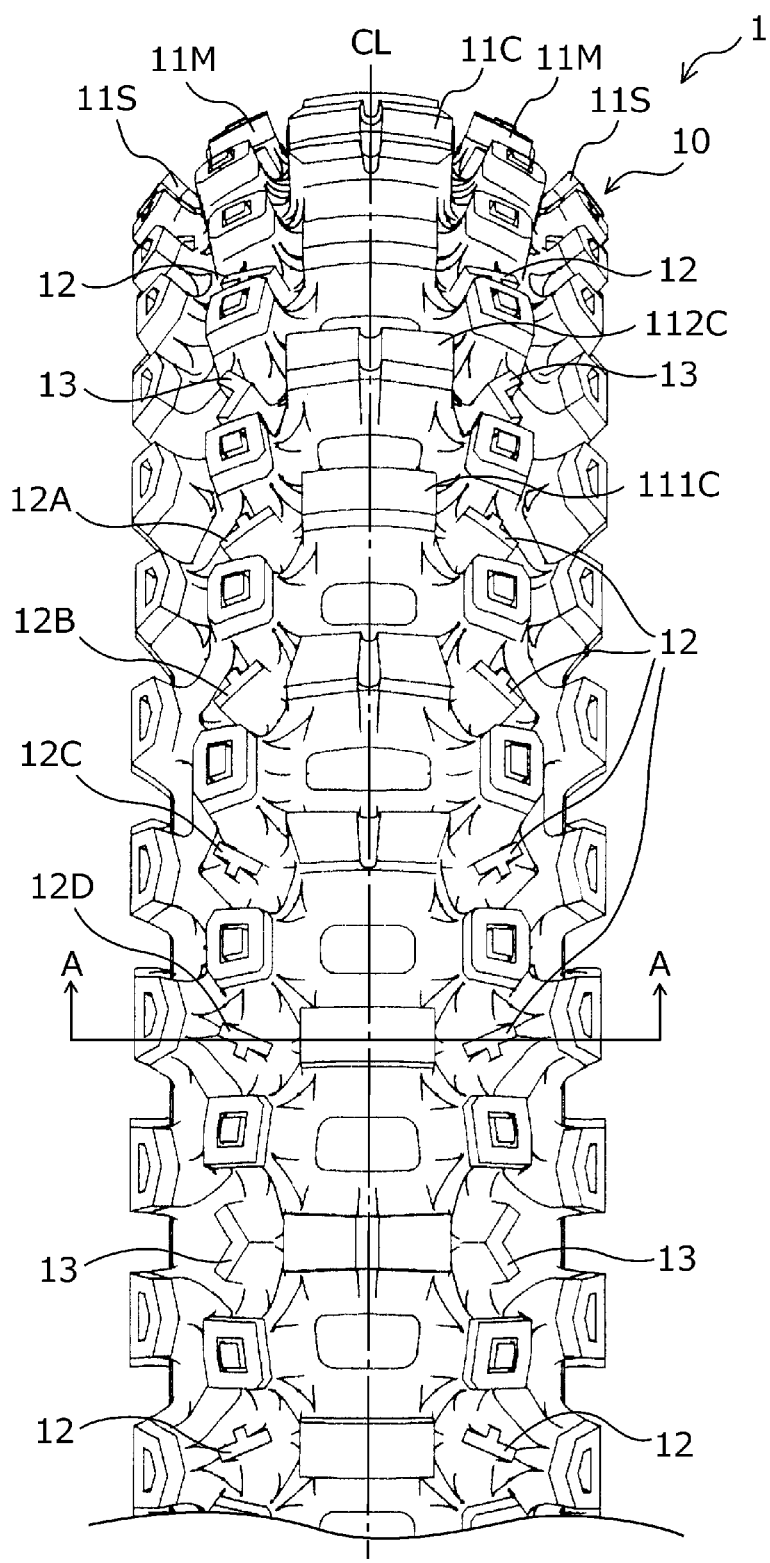
FIG. 1 is a partial perspective view illustrating one example of a two-wheeled vehicle tire of the present invention.

Embodiments of the present invention will now be described in detail referring to the drawings.

Figure 2:
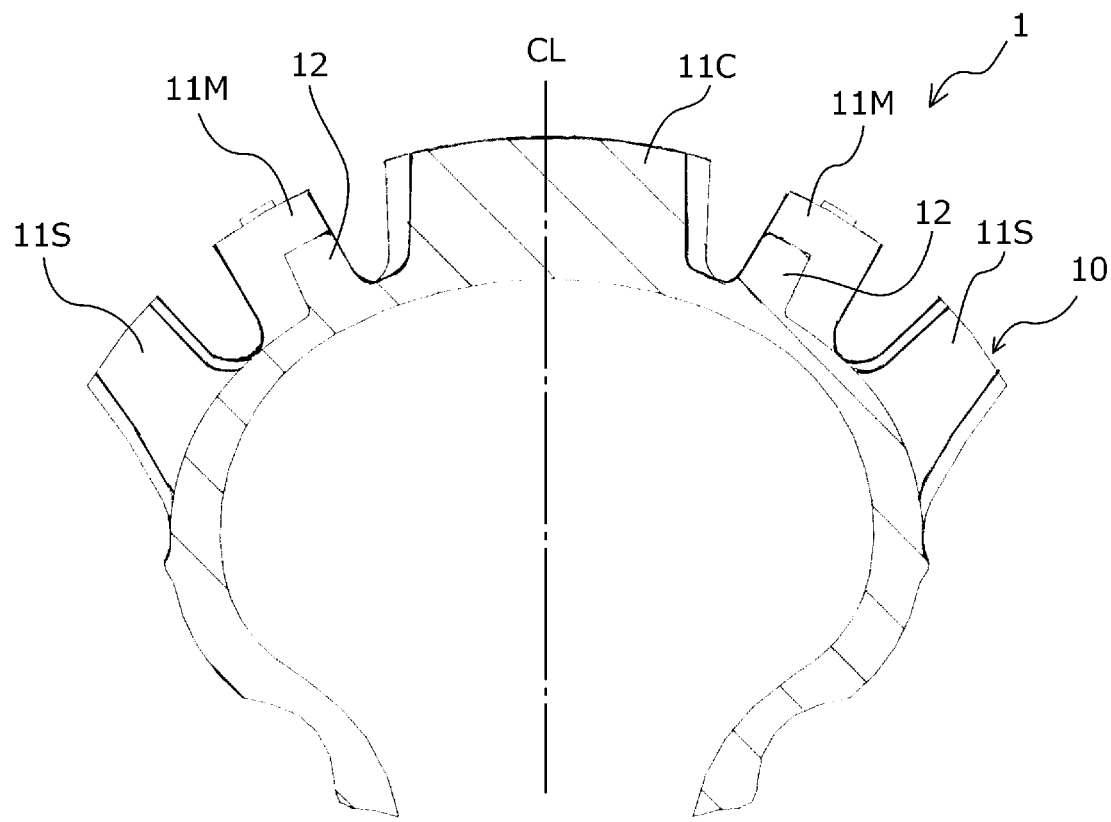
FIG. 2 is a cross-sectional view taken along a line A-A in FIG. 1.

FIG. 1 is a partial perspective view illustrating one example of a two-wheeled vehicle tire of the present invention. Further, FIG. 2 is a cross-sectional view taken along a line A-A in FIG. 1. As illustrated, a two-wheeled vehicle tire 1 of the present invention has a tread portion 10 formed in an annular shape, and a tread pattern constituted by plural block-shaped land portions is formed in the tread portion 10. The tread pattern of the illustrated tire is line-symmetric about a tire equator CL, and this tire has no designated rotational direction.

As illustrated, in the tire 1 of the present invention, the tread portion 10 includes: center land portions 11C which are arranged on the tire equator CL; middle land portions 11M which are arranged on the tire width-direction outer side of the center land portions 11C; and shoulder land portions 11S which are arranged on the tire width-direction outer side of the middle land portions 11M. As illustrated in FIG. 2, the center land portions 11C, the middle land portions 11M, and the shoulder land portions 11S all have the same height by design.

The tire 1 of the present invention is characterized in that, in addition to the center land portions 11C, the middle land portions 11M, and the shoulder land portions 11S, T-shaped or Y-shaped land portions 12 and 22 are arranged between the center land portions 11C and the shoulder land portions 11S. In this two-wheeled vehicle tire, those regions between the center land portions 11C and the shoulder land portions 11S are the regions that mostly come into contact with the ground during turning. Accordingly, by arranging the T-shaped or Y-shaped land portions 12 and 22 between the center land portions 11C and the shoulder land portions 11S, the T-shaped or Y-shaped land portions 12 and 22 generate traction during turning, whereby a further improvement in the traction performance during turning, particularly in the traction performance during turning on soft ground, can be realized.

Figure 3:
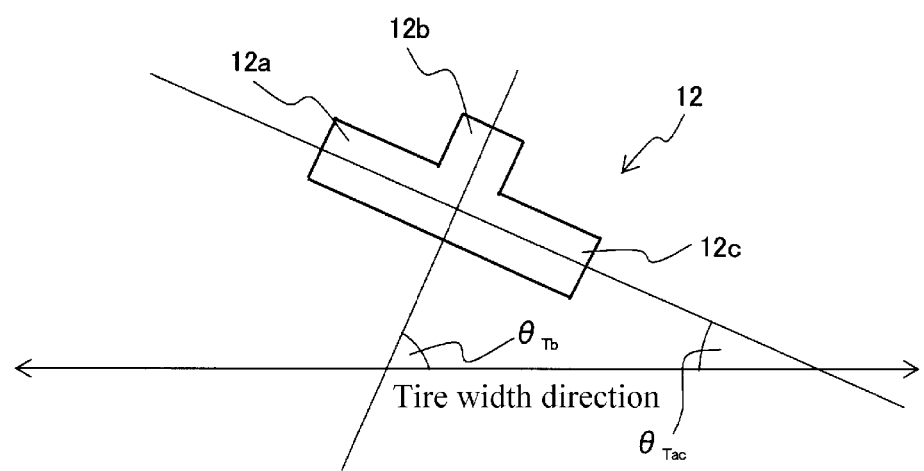
FIG. 3 is an enlarged plan view illustrating a T-shaped land portion extracted from FIG. 1.
Figure 4:
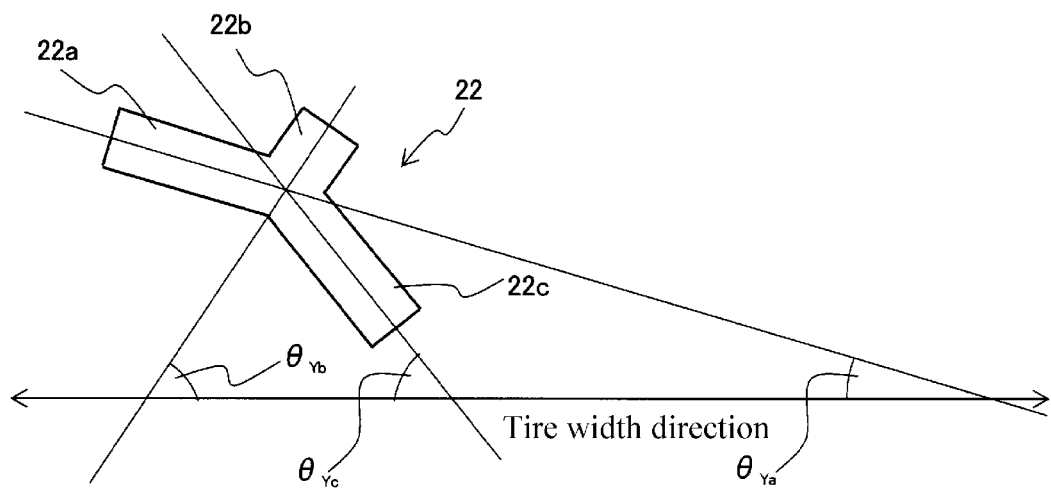
FIG. 4 is an enlarged plan view illustrating one example of a Y-shaped land portion.

In the example illustrated in FIGS. 1 and 2, T-shaped land portions 12 are arranged between the center land portions 11C and the shoulder land portions 11S; however, the same effect can be obtained even with Y-shaped land portions. FIG. 3 is an enlarged plan view illustrating a T-shaped land portion 12 extracted from FIG. 1. Further, FIG. 4 is an enlarged plan view illustrating one example of a Y-shaped land portion 22. As illustrated, the T-shaped or Y-shaped land portions 12 and 22 are each constituted by three partial land portions 12a to 12c and 22a to 22c that are connected at one end, respectively. In other words, the T-shaped land portion 12 and the Y-shaped land portion 22 have a relationship in which, when two partial land portions 22a and 22c of the three partial land portions 22a to 22c constituting the Y-shaped land portion 22 have the same inclination angle, the Y-shaped land portion 22 is substantially a T-shaped land portion.

The T-shaped or Y-shaped land portions 12 and 22 have a shape that is constituted by the three partial land portions 12a to 12c and 22a to 22c having different inclination angles, respectively; therefore, these land portions 12 and 22 can contribute to the generation of traction during turning regardless of the orientation in their arrangement. For example, in order to obtain traction in the front-rear direction, among the three partial land portions 12a to 12c and 22a to 22c, the more the portion extending in the tire width direction, the more preferred it is, and, therefore, it is considered to arrange the T-shaped land portion 12 such that the partial land portions 12a and 12c extend along the tire width direction and the Y-shaped land portion 22 such that a straight line connecting the ends of the partial land portions 22a and 22c is in parallel to the tire width direction. Particularly, in the present invention, it is preferred to arrange the T-shaped or Y-shaped land portions 12 and 22 such that at least two of the three partial land portions 12a to 12c and 22a to 22c, respectively, extend at an angle with respect to both the tire circumferential direction and the tire width direction. By arranging the T-shaped or Y-shaped land portions 12 and 22 in this manner, traction can be exerted in a good balance between the front-rear direction and the lateral direction during turning. More preferably, the T-shaped or Y-shaped land portions 12 and 22 are arranged such that all of the three partial land portions 12a to 12c and 22a to 22c, respectively, extend at an angle with both the tire circumferential direction and the tire width direction.

In the illustrated preferred example, the T-shaped land portion 12 has a shape in which the partial land portions 12a and 12c of the three partial land portions 12a to 12c have the same inclination angle and the remaining partial land portion 12b extends in the direction orthogonal to the extending direction of the partial land portions 12a and 12c; however, the shape of the T-shaped land portion 12 is not restricted to this example. For example, the remaining partial land portion 12b may extend in a direction that intersects with the extending direction of the partial land portions 12a and 12c at an angle of larger than 0° but smaller than 90°. Further, in the illustrated example, the partial land portions 12a and 12c have the same length while the partial land portion 12b is formed at a shorter length than the partial land portions 12a and 12c; however, the lengths of these partial land portions are not restricted to this example. For example, the partial land portion 12b may be formed at a longer length than the partial land portions 12a and 12c, or the partial land portions 12a to 12c may all have the same length, or different lengths to each other.

Meanwhile, in the illustrated preferred example, the Y-shaped land portion 22 has a shape in which the partial land portions 22a and 22c of the three partial land portions 22a to 22c extend in directions that are line-symmetric about the extending direction of the remaining partial land portion 22b; however, the shape of the Y-shaped land portion 22 is not restricted to this example. For example, the three partial land portions 22a to 22c may all extend in random directions to one another. Further, in the illustrated example, the partial land portions 22a and 22c have the same length while the partial land portion 22b is formed at a shorter length than the partial land portions 22a and 22c; however, the lengths of these partial land portions are not restricted to this example. For example, the partial land portion 22b may be formed at a longer length than the partial land portions 22a and 22c, or the partial land portions 22a to 22c may all have the same length, or different lengths to each other.

Specific inclination angles of the three partial land portions 12a to 12c and 22a to 22c that constitute the T-shaped or Y-shaped land portions 12 and 22, respectively, can be decided taking into consideration the balance between the traction in the front-rear direction and the traction in the lateral direction. For example, with regard to the T-shaped land portion 12, an inclination angle $\theta_{Tac}$ of the partial land portions 12a and 12c with respect to the tire width direction is in a range of preferably 25° or larger, more preferably 35° or larger, but preferably 55° or smaller, more preferably 45° or smaller, and an inclination angle $\theta_{Tb}$ of the partial land portion 12b with respect to the tire width direction is in a range of preferably 35° or larger, more preferably 45° or larger, but preferably 65° or smaller, more preferably 55° or smaller. Further, with regard to the Y-shaped land portion 22, an inclination angle $\theta_{Ya}$ of the partial land portion 22a with respect to the tire width direction is in a range of preferably 25° or larger, more preferably 35° or larger, but preferably 55° or smaller, more preferably 45° or smaller; an inclination angle $\theta_{Yb}$ of the partial land portion 22b with respect to the tire width direction is in a range of preferably 35° or larger, more preferably 45° or larger, but preferably 65° or smaller, more preferably 55° or smaller; and an inclination angle $\theta_{Yc}$ of the partial land portion 22c with respect to the tire width direction is in a range of preferably 25° or larger, more preferably 35° or larger, but preferably 55° or smaller, more preferably 45° or smaller.

As illustrated, it is preferred that T-shaped or Y-shaped land portions 12 and 22 be arranged at a lower height than the land portions arranged adjacent to the T-shaped or Y-shaped land portions 12 and 22. This enables to obtain a traction-improving effect particularly when the tire sinks deep into the ground during travel on soft ground, and does not deteriorate the soil removability. For example, in the example illustrated in FIG. 1, the T-shaped land portions 12 are arranged adjacent to the center land portions 11C and the middle land portions 11M; therefore, the T-shaped land portions 12 are preferably arranged at a lower height than the center land portions 11C and the middle land portions 11M. More preferably, the T-shaped or Y-shaped land portions 12 and 22 are arranged a lower height than all of other land portions arranged in the tread portions 10. The T-shaped or Y-shaped land portions 12 and 22 may have a height of, for example, ⅓ to ⅔ of the height of the center land portions 11C, the middle land portions 11M and the shoulder land portions 11S.

The T-shaped or Y-shaped land portions 12 and 22 are provided in the regions that are used during turning and positioned between the center land portions 11C and the shoulder land portions 11S, and can thereby contribute to an improvement of the traction performance during turning. Preferably, by alternately arranging the middle land portions 11M and the T-shaped or Y-shaped land portions 12 and 22 along the tire circumferential direction, a traction performance-improving effect can be obtained in a balanced manner. In this case, as illustrated in FIG. 1, the middle land portions 11M and the T-shaped land portions 12 are alternately arranged along the tire circumferential direction with overlaps in the tire width direction. The T-shaped or Y-shaped land portions 12 and 22 that are arranged in plural numbers in the tire circumferential direction may have different shapes and dimensions, and the inclination angles $\theta_{Tac}$, $\theta_{Tb}$, $\theta_{Ya}$, $\theta_{Yb}$, $\theta_{Yc}$ of the partial land portions 12a to 12c and 22a to 22c may be different from one another. Further, as illustrated in FIG. 1, the T-shaped or Y-shaped land portions 12 and 22 that have substantially the same shape may be arranged such that the orientation of the T-shape and that of the Y-shape, namely the protruding direction of the partial land portion 12b and that of the partial land portion 22b, are different.

In the example illustrated in FIG. 1, the regions that come into contact with the ground during turning are provided with sections in which the middle land portions 11M and the T-shaped land portions 12 are alternately arranged in the tire circumferential direction, and V-shaped land portions 13 are arranged in place of the T-shaped land portions 12 in some parts of the sections. In other words, a pattern in which five middle land portions 11M, four T-shaped land portions 12 having different orientations and inclination angles, and a single V-shaped land portion 13 are alternately arranged in the tire circumferential direction, the pattern being defined as one pitch, is repeatedly arranged in the tire circumferential direction. Further, in the illustrated example, when the four T-shaped land portions 12 that are contained in one pitch and have different orientations and inclination angles are denoted as T-shaped land portions 12A to 12D, the T-shaped land portions 12A and 12B and the T-shaped land portions 12C and 12D are arranged in a line-symmetric manner in the tire circumferential direction about a straight line that is drawn along the tire width direction through a midpoint between the T-shaped land portion 12B and the T-shaped land portion 12C in the tire circumferential direction.

In the tire of the present invention, what is important is that the above-described T-shaped or Y-shaped land portions are arranged in the tread portion 10 and this enables to obtain the expected effects of the present invention. In the present invention, the center land portions 11C, the middle land portions 11M, and the shoulder land portions 11S can be arranged as appropriate based on the related art and are not particular restricted. Moreover, in the present invention, the tread portion 10 may include other land portions in addition to the center land portions 11C, the middle land portions 11M, the shoulder land portions 11S, and the T-shaped or Y-shaped land portions 12 and 22.

For example, the center land portions 11C, the middle land portions 11M, and the shoulder land portions 11S, which are arranged in plural numbers in the tire circumferential direction, may have different shapes and dimensions. In the illustrated example, the center land portions 11C are composed of land portions 111C which have a substantially rectangular shape, and land portions 112C which have a substantially rectangular shape and include a recess along the tire circumferential direction on the tire equator. The middle land portions 11M have a substantially rectangular shape and include a protruding part on the center in a shape analogous to their outlines, and a sipe is cut along the outline of this protruding part. Further, the shoulder land portions 11S have a substantially pentagonal shape and include a recess on the center in a shape analogous to their outlines.

The tire of the present invention can be configured in accordance with a conventional method and is not particularly restricted in terms of the tire internal structure, the member arrangement, the materials to be used, and the like.

For example, the tire 1 of the present invention includes: at least one carcass ply as a skeleton; and side wall portions and bead portions, which are sequentially arranged on both tire radial-direction sides of the tread portion 10. The carcass ply is formed by arranging relatively high-elasticity textile cords in parallel to one another. The number of carcass plies may be one, two, or three or more. In the bead portions, the ends of each carcass ply may be folded around the respective bead cores from the inside to the outside of the tire and thereby anchored, or may be sandwiched by bead wires from both sides and thereby anchored, and either of these fixation methods may be employed.

In the tire 1 of the present invention, at least one belt layer can be arranged on the tire radial-direction outer side of the carcass ply in the tread portion 10. The belt layer may be, for example, a spiral belt that is composed of a rubber-coated cord spirally wound along the tire circumferential direction. Examples of a reinforcing material constituting the belt layer include nylon fibers, aromatic polyamides (trade name: KEVLAR), and steel. Thereamong, aromatic polyamides and steel are reinforcing materials that do not elongate even at high temperatures and are thus capable of inhibiting swelling of the tread portion.

Further, in the tire 1 of the present invention, bead fillers may be arranged on the tire radial-direction outer side of the respective bead cores, and an inner liner may be arranged as the innermost layer of the tire.

Still further, in the tire 1 of the present invention, the tread portion 10 may have a bilayer structure constituted by a cap rubber on the tread surface side and a base rubber on the tread bottom side, and the cap rubber and the base rubber may be different in hardness. By allowing the tread rubber to have such a bilayer structure constituted by a cap rubber and a base rubber that are different in hardness, necessary properties can be ensured without modifying the rigidity of the blocks as a whole by adopting, for example, a combination of a hard cap rubber and a soft base rubber, or a combination of a soft cap rubber or a hard base rubber, in accordance with the road surface conditions. The hardness of the cap rubber and that of the base rubber can be adjusted by appropriately selecting a rubber composition and a filler thereof in accordance with a conventional method.

The tire of the present invention is excellent particularly in the traction performance during turning on soft ground and, therefore, can be suitably used as, for example, a tire for motocross that is intended to be used on rough terrain including muddy terrain. The tire of the present invention is particularly suitable as a rear tire.

EXAMPLES

The present invention will now be described in more detail by way of Examples thereof.

Example

A motorcycle tire of Example, as illustrated in FIGS. 1 and 2, having a tread portion formed in an annular shape and plural land portions formed in the tread portion was produced. As illustrated, center land portions arranged on the tire equator, middle land portions arranged on the tire width-direction outer side of the center land portions, and shoulder land portions arranged on the tire width-direction outer side of the middle land portions were formed in the tread portion. Specifically, between the center land portions and the shoulder land portions, a pattern in which five middle land portions, four T-shaped land portions having different orientations and inclination angles, and a single V-shaped land portion were alternately arranged in the tire circumferential direction, the pattern being defined as one pitch, was repeatedly arranged in the tire circumferential direction. Further, the T-shaped land portions were each constituted by three partial land portions connected at one end, and these three partial land portions extended at an angle with respect to both the tire circumferential direction and the tire width direction. Moreover, the T-shaped land portions and the V-shaped land portion had substantially the same height and were formed at a height of about ½ of the height of the center land portions 11C, the middle land portions 11M, and the shoulder land portions 11S, which all had the same height.

Conventional Example

A tire of Conventional Example was produced in the same manner as in Example, except that neither the T-shaped land portions nor the V-shaped land portion was arranged.

The test tires of Example and Conventional Example were each mounted as a rear tire of a motocross motorcycle. A running test was conducted by a test rider, and the traction performance during turning was evaluated based on the rider's feel. As a result, the test tire of Example was confirmed to have an improved traction performance during turning, particularly an improved traction performance during turning on soft ground, as compared to the test tire of Conventional Example.

DESCRIPTION OF SYMBOLS

1: two-wheeled vehicle tire
10: tread portion
11C: center land portion
11M: middle land portion
11S: shoulder land portion
12, 12A to 12D: T-shaped land portion
12a to 12c, 22a to 22c: partial land portion
13: V-shaped land portion
22: Y-shaped land portion
111C: land portion having substantially rectangular shape
112C: land portion having substantially rectangular shape and recess along the tire circumferential direction on tire equator
CL: tire equator
$\theta_{Tac}$: inclination angle of partial land portions 12a and 12c
$\theta_{Tb}$: inclination angle of partial land portion 12b
$\theta_{Ya}$: inclination angle of partial land portion 22a
$\theta_{Yb}$: inclination angle of partial land portion 22b
$\theta_{Yc}$: inclination angle of partial land portion 22c

The invention claimed is:

1. A two-wheeled vehicle tire, comprising a tread portion formed in an annular shape,
wherein,
the tread portion comprises: center land portions arranged on a tire equator; middle land portions arranged on the tire width-direction outer side of the center land portions; and shoulder land portions arranged on the tire width-direction outer side of the middle land portions, and
T-shaped or Y-shaped land portions, wherein:
the T-shaped or Y-shaped land portions are each constituted by three partial land portions connected at one end,
the T-shaped or Y-shaped land portions are arranged between the center land portions and the shoulder land portions,
a top face of the T-shaped land portions is flat and has a T-shape and a top face of the Y-shaped land portions is flat and has a Y-shape,
the T-shaped or Y-shaped land portions are arranged at a lower height than all of the center land portions, the middle land portions and the shoulder land portions,
the T-shaped or Y-shaped land portions are different land portions with a different top surface from the middle land portions, and
all of the T-shaped and Y-shaped land portions are arranged only between the middle land portions in a tire circumferential direction.

2. The two-wheeled vehicle tire according to claim 1, wherein at least two of the three partial land portions of the T-shaped or Y-shaped land portions extend at an angle with respect to both the tire circumferential direction and the tire width direction.

3. The two-wheeled vehicle tire according to claim 2, comprising a section in which the middle land portions and the T-shaped or Y-shaped land portions are alternately arranged in the tire circumferential direction.

4. The two-wheeled vehicle tire according to claim 1, comprising a section in which the middle land portions and the T-shaped or Y-shaped land portions are alternately arranged in the tire circumferential direction.

5. The two-wheeled vehicle tire according to claim 1, wherein the middle land portions and the T-shaped or Y-shaped land portions are alternately arranged along the tire circumferential direction.

6. The two-wheeled vehicle tire according to claim 1, wherein the middle land portions and the T-shaped or Y-shaped land portions are alternately arranged in the tire circumferential direction, and V-shaped land portions are arranged in place of the T-shaped or Y-shaped land portions in at least one part along the tire circumferential direction.

* * * * *